(12) United States Patent
Gosling (10) Patent No.: US 6,618,754 B1
(45) Date of Patent: *Sep. 9, 2003

(54) SYSTEM FOR TRANSMISSION OF EMBEDDED APPLICATIONS OVER A NETWORK

(75) Inventor: James A. Gosling, Woodside, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/546,808

(22) Filed: Oct. 23, 1995

(51) Int. Cl.⁷ .............................................. G06F 15/16
(52) U.S. Cl. ...................................................... 709/220
(58) Field of Search ................................. 395/680, 685, 395/682; 709/300, 303, 302, 328, 310, 202, 203, 218, 317, 220, 221, 222; 707/513, 10

(56) References Cited

U.S. PATENT DOCUMENTS

| | | | | |
|---|---|---|---|---|
| 4,903,258 A | * | 2/1990 | Kuhlman et al. | 370/360 |
| 5,050,071 A | * | 9/1991 | Harris et al. | 364/282.4 |
| 5,109,484 A | * | 4/1992 | Hughes et al. | 395/200 |
| 5,347,632 A | | 9/1994 | Filepp et al. | |
| 5,619,250 A | * | 4/1997 | McClellan et al. | 348/10 |
| 5,640,592 A | * | 6/1997 | Rao | 395/825 |
| 5,712,638 A | * | 1/1998 | Issa | 341/176 |
| 5,742,238 A | * | 4/1998 | Fox et al. | 346/825.46 |
| 5,787,281 A | * | 7/1998 | Schreiber et al. | 709/328 |
| 5,838,906 A | * | 11/1998 | Doyle et al. | 395/200.32 |
| 5,922,050 A | * | 7/1999 | Madany | 709/222 |

FOREIGN PATENT DOCUMENTS

| | | | | |
|---|---|---|---|---|
| EP | 674280 | * | 9/1995 | G06F/17/30 |
| WO | WO96/17306 | * | 6/1996 | |

OTHER PUBLICATIONS

Object Linking & Embedding, Programmers Reference, Version 1.0, Microsoft Press, pp. 4–10, 1992.*
Hardware–Software Co Design of Embedded System, Chisdo et al., IEEE Micro, pp. 26–36, Aug. 1994.*
A. Laursen, et al, "Oracle Media Server: Providing Consumer Based Interactive Access to Multimedia Data", ACM, pp. 470–477, May, 1994.*
James Gosling & Henry McGilton, "The Java Language Environment A White Paper", Oct. 1995, Sun Microsystems, pp. 1–88.*

(List continued on next page.)

Primary Examiner—Sue Lao
(74) Attorney, Agent, or Firm—Gary S. Williams; Pennie & Edmonds LLP (57) ABSTRACT

A system and method for transmitting embedded applications over a network is disclosed, wherein a user of a computer-controlled network client, such as a remote control device used for controlling a network of computer-controlled home entertainment devices, or a Web browser running on a Web client, can request and receive compound documents that include embedded applications and/or data files that can only be processed (i.e., imaged or played) by handlers that are not resident on the client. In addition to embedded documents, the compound documents that are transmitted over the network can reference flat files (e.g, image, audio, or text files), and other compound documents. Whenever a client receives a compound document, the client determines whether it has access to all of the documents referenced in the compound document and, if not, requests the documents to which it does not have local access. So that the multiple documents embedded in a compound document can be simultaneously output by the client to a multimodal output device, the requestor includes a multi-tasking real-time kernel. This scheme allows a client user to download documents from a server that include embedded applications, which when executed on the client, allow the client to control the servers using commands downloaded from the servers.

27 Claims, 6 Drawing Sheets

OTHER PUBLICATIONS

"A Brief Overview of the VIOLA Engine, and its Applications" by Pei Y. Wei, R&D, Digital Media Group, O'Reilly & Associates. pei@ora.com Undated/Unpublished (previously on the WWW) 14 pages.

Ken Thompson, "Regular Expression Search Algorithm," *Communications of the ACM,* Jun. 1968, vol. 11, No. 6, pp. 419–422.

Kin–Man Chung and Herbert Yuen, "A 'Tiny' Pascal Compiler; Part 1: The P–Code Interpreter," *BYTE Publications, Inc.,* Sep. 1978.

Kin–Man Chung and Herbert Yuen, "A 'Tiny' Pascal Compiler; Part 2: The P–Compiler," *BYTE Publications, Inc.,* Oct. 1978.

Gene McDaniel, "An Analysis of a Mesa Instruction Set," *Association for Computing Machinery,* May 1982.

Kenneth A. Pier, "A Retrospective on the Dorado, A High–Performance Personal Computer," *IEEE Computer Society, 10th Annual Intl. Symposium on Computer Architecture,* 1983, pp. 252–269.

"The Java Language Specification", Release 1.0 Alpha3, May 11, 1995, Sun Microsystems Computer Corporation.

"Eolas Acquires Millstone Internet Software Patent", Bulletin Board Thread, Aug. 21, 1995, Michael D. Doyle, Ph.D., Eolas Technologies Incorporated.

"Eolas Acquires Milestone Internet Software Patent", Bulletin Board Theard, Aug. 21, 1995, Pei Wei, pei@gnn.com.

"Eolas Acquires Milestone Internet Software Patent", Bulletin Board Thread, Aug. 21, 1995, Larry Masinter, masinter@parc.xero.com.

"Weblet Patent", Bulletin Board Thread, Aug. 21, 1995, Benjamin Franz, snowhare@netimages.com.

"Eolas Acquires Milestone Internet Software Patent", Bulletin Board Thread, Aug. 21, 1995, bobwyman@medio.com.

"Release of Viola WWW 3.3", Bulletin Board Posting, Pei Wei, Apr. 17, 1995, release dated Apr. 10, 1995, wei@ora.com, O'Reilly & Associates, Inc.

"Browser Implementation of Active Images", Bulletin Board Thread, Jul. 13, 1994, author: "bp", wmperry@spry.com.

"Viola–WWW Interface", Bulletin Board Theard, Tim Berners–Lee, timbl, Jan. 24, 1992.

"An Updated Quick Look at ViolaWWW"Bulletin Board Posting, May 10, 1992, by "Tim BL".

Alsop, Stewart "HotJava could become a lot hotter than just a Web browser of animations." InfoWorld (1995) 17:94.

Gilder, George "The coming software shift." Forbes ASAP (1995) 147–162.

Gosling et al., "The Java language envirnoment." Sun Microsystems A White Paper (1996) 1–95.

Goulde, M., "Sun Microsystems bringing interactive technology to the WWW." Open Information Systems (1995) 10:29–33.

Grossman, E., "OSF adds ingredients to operating system." PC Week (1989) 29,33.

Van Hoff, Arthur, "Java and internet programming." Dr. Dobb's Journal (1995) 56,58–60; 101–102.

HP "The common object request broker: architecture and specification." COBRA V2. Revision 2.0 (1995).

Raynovich, R. Scott, "Sun, Netscape to wake up web users." LAN Times (1995) 12:44–45.

Raynovich, R. Scott, "Complex browsers seek to expand role." Lan Times (1995) 12:1–3.

Schwartz, G., "Hi–resolution"PC–computing (1995) 8:77–78.

Snell, Jason "The Internet becomes multi–media savvy: Macromedia, Sun nab Netscape Navigator." MacUser (1995) 11:31.

"The spring collection:" (A collection of papers on the spring distributed object–oriented operating system), Sun-Soft, (1994).

Tanenbaum et al., "A practical tool kit for making portable compilers", Communications of the ACM (1983) 26:654–660.

Teitelman et al., "The interlisp programming enviroment", IEEE (1981) 25–33.

Walker et al. "The LOCUS distributed operating system." ACM (1983) 49–70.

Author Unknown, "MEMEX information engines." Database and Network Journal 15:15–16.

Author Unknown, "Internet access: Sun unveils most complete set of Internet business solutions available today; Internet pioneer delivers on challenge of electronic commerce." EDGE: Work–Group computing report (1995) 6;47–49.

Author Unknown. "OSF opens software web mall for JAVA." Newsbytes (1995).

* cited by examiner

SYSTEM FOR TRANSMISSION OF EMBEDDED APPLICATIONS OVER A NETWORK

The present invention relates generally to networks of clients and servers, and particularly to networks where clients are allowed to control the operation of some of the servers.

BACKGROUND OF THE INVENTION

The present invention is an improvement over compound document transmission capabilities provided by current networks.

For the purposes of this document, a "network" is understood to be a plurality of interconnected, computer-controlled devices that are capable of cooperative interactions. In most networks (for example, the Internet), the networked devices are either clients (users of documents) or servers (providers of documents). In such a network architecture, a client is able to download documents and have services performed remotely by sending appropriate messages to the particular "server(s)" that is(are) responsible for performing the service or storing the desired documents. Of course, for the client to be able to do anything with downloaded documents, those documents must be provided in a format that allows the client to display or execute the document.

At the Internet's inception, this compatibility did not pose a great challenge. Many of the documents stored on servers were simple flat text (i.e., ASCII) files which, after being downloaded using a standard protocol such as TCP/IP, could be displayed on a client with a common text editor or viewer. Later, flat image files of various formats (TIFF, GIF, JPEG, etc.) became available on Internet servers, which required special graphics viewers to be available on the client. Over time, as the number of documents stored on the Internet and the variety of document formats grew, it became clear that there was a need for an Internet document transmission facility that would allow a user painlessly to view Internet documents of various, even mixed formats (e.g., compound documents that incorporate ASCII text and differently-formatted graphics), and easily find and view other documents related to the document just downloaded. This need was addressed by the World-Wide Web.

The World-Wide Web ("WWW") links many of the servers making up the Internet, each storing documents identified by unique universal resource locators (URLs). Many of the documents stored on Web servers are written in a standard document description language called HTML (hypertext markup language). Using HTML, a designer of Web documents can associate hypertext links or annotations with specific words or phrases in a document (these hypertext links identify the URLs of other Web documents or other parts of the same document providing information related to the words or phrases ) and specify visual aspects and the content of a Web page.

A user accesses documents stored on the WWW using a Web browser (a computer program designed to display HTML documents and communicate with Web servers) running on a Web client connected to the Internet. Typically, this is done by the user entering the URL of a desired document or selecting a hypertext link (displayed by the Web browser as a highlighted word or phrase) within a document being viewed with the Web browser. The Web browser then issues a HTTP (hypertext transfer protocol) request for the requested document to the Web server identified by the requested document's URL. In response, the designated Web server returns the requested document to the Web browser, also using the HTTP, and the Web browser displays the document locally, including any text and images associated with the document. The document delivery capabilities and ease of use features provided by the Web and Web browsers are invaluable. However, HTML and the Web would be even more useful if they provided support for embedded applications in HTML documents.

Currently, there is no way to imbed executable code fragments, or links to executable code fragments, within an HTML Web page so that the code fragments are executable on a Web client. Such a capability would be very useful as the embedded code fragments could range from simulations, sound clips or video clips interactively running within a Web page, to communications routines or application programs that could be triggered by a user of the Web browser from the embedding compound document. Moreover, these capabilities could be used to allow a user to download data from a Web server without being concerned that the appropriate type of handler is resident on their Web client. That is, a Web document embedding a particular type of data could also include an address to the appropriate handler for the data so that, if needed, the user's Web browser could find, download and execute the needed handler on the data.

Aside from the use of embedded applications in Web pages, other uses for embedded documents within networks of computer controlled devices are apparent. For example, in home entertainment systems, where there are multiple components, each with a unique command set (sometimes very complex) and unique user interfaces (typically unintuitive), documents with embedded application capabilities could be adapted to provide a highly adaptable universal remote control. Such a system would allow a user to interact with the various components using a visually-oriented remote control device that displays user control options (about which the remote is ignorant) and other information, such as context sensitive help messages and graphics that are downloaded from the component being controlled. I.e., such a universal remote would be able to control devices about whose functionality it has no pre-programmed knowledge.

Thus, there is a need for a system and method for embedding applications, or code fragments, in documents transmitted over a network between computer-controlled network devices. This system and method should allow the client to request and receive from a server an executable program that the client can then execute in the context of the document in which the application was embedded. The executable programs should be of at least four types: (1) output code that, when executed, produces a visual or audible manifestation (e.g, graphical or sound simulations), (2) meta-knowledge code that can advise a user regarding legal interactions with the document in which the code fragment was embedded, (3) contextual code that can sense and indicate the processing context of the compound document in which the code fragment was embedded; and (4) handlers for embedded data.

SUMMARY OF THE INVENTION

In summary, the present invention is a system and method for transmission of embedded documents over a computer network that meets the needs set out above.

More particularly, the present invention is a system for transmitting embedded documents over a network that includes at least one server and at least one client, each server and client including a computer controller and a memory and having a unique network ID. The system includes a requestor that is executable on a client's computer controller, which is configured to control messages issued by the client on the network. One of these messages is a document request message that instructs a particular one of the servers to transmit to the client a particular compound document, where a compound document is a document that references or includes a plurality of embedded documents that can be executable code fragments, flat documents or other compound documents.

Another aspect of the present invention is a provider that is executable on a server's computer controller. The provider is responsive to messages directed to the server. For example, the provider is configured to respond to the document request message by causing the server to transmit to the client the particular requested compound document. Upon receiving a particular compound document, the requestor is configured to retrieve at least a subset of the embedded documents referenced by the particular compound document that are not stored in the client's memory and form an assembled compound document including the flat documents and the executable code fragments.

The present invention is also a method for transmitting embedded documents over a network that includes at least one server and at least one client coupled to the network, each server and client including a computer controller and a memory and having a unique network ID. As the first step in the method, a client issues a document request message on the network to a particular server, where the document request message designates a particular compound document to be returned to the client by the particular server. Next, in response to the document request message, the particular server returns the particular compound document to the client. This compound document includes references to a plurality of embedded documents, each of which has a type selected from executable code fragments, flat documents and other compound documents. Upon receiving the compound document from the server, the client issues a plurality of document request messages to retrieve via the network any flat documents and executable code fragments referenced by the compound document that are not stored in the client's memory. Finally, the client forms an assembled compound document including the retrieved flat documents and executable code fragments.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
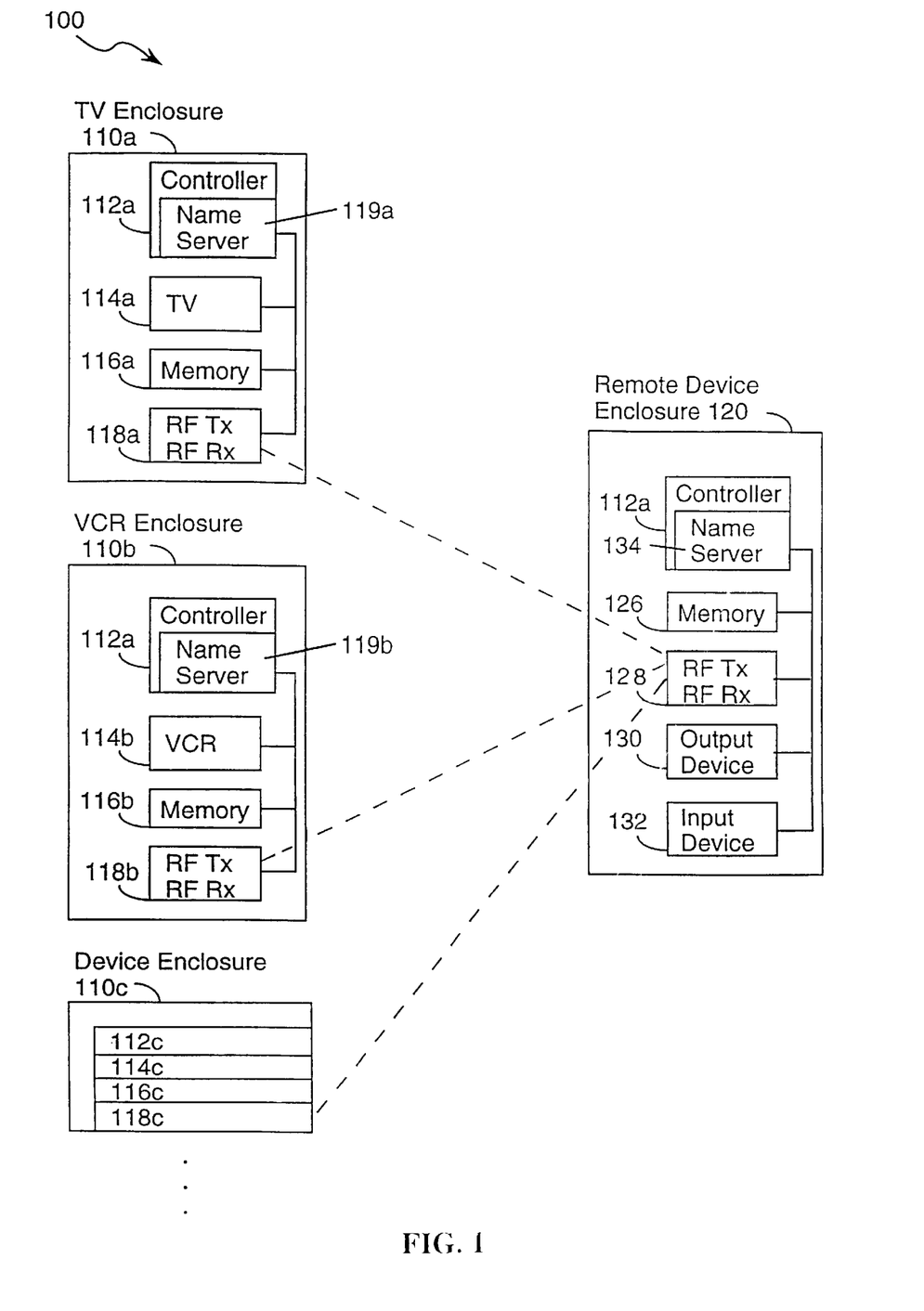
FIG. 1 is a block diagram of a preferred embodiment.

Referring to FIG. 1, there is shown a block diagram of the preferred embodiment, in which a multiplicity of device enclosures 110a–c (hereinafter referred to as "enclosures") are networked with a remote control device 120 using RF transmissions received and transmitted via a radio frequency (RF) receiver/transmitter 118a–c, 128 provided in each respective enclosure 110a–c and the remote control device 120. In the preferred embodiment, the remote control device 120 acts as the network client (i.e. a user of documents) and the enclosures 110a–c the network servers (i.e., providers of documents), each of which has a unique network address.

Each of the enclosures corresponds to a typical piece of equipment in a home entertainment system. For example, the enclosures 110a, 110b correspond to a TV set and a VCR unit, respectively. Other types of enclosure are represented in FIG. 1 by the generic enclosure 110c. In addition to the RF receiver/transmitter 118, each of the enclosures 110a–c includes a computer controller 112a–c, a characteristic device 114a–c and memory 116a–c (some of which is nonvolatile), all of which are coupled to the controller 112.

Each characteristic device performs the function that people identify with the enclosure. For example, where the enclosures 110a, 110b are a TV enclosure and a VCR enclosure, the respective characteristic devices are a TV tuner/display 114a and a VCR tuner/recorder/player 114b. Typically, each of these devices can be manually controlled via a front panel provided in the enclosure 110. Alternatively, in the remote control mode addressed by the preferred embodiment, each characteristic device 114 is controlled by the device's local controller 112 based on appropriate control messages issued over the RF network by the remote control device 120. One of the keys to the present invention is that these control messages and the knowledge of how to control a particular device are not prestored in the remote control device 120. Rather the remote control device 120 dynamically downloads whatever information it needs, including executable code fragments and flat files, from the enclosure 110 to be controlled. For each enclosure 110a–c, this control information and an operating system for the controller 112a–c, are non-volatilely stored in a memory 116a–c. The remote control device 120 (hereinafter referred to as the "remote" or "remote control") is an adaptable, universal remote that can control any of the enclosures 110a–c and guide a user through the procedures for controlling the enclosures 110a–c. Principal elements of the remote control device 120 include the RF transmitter/receiver 128, a computer controller 122, a memory 126 (some of which is non-volatile), a multimode output device 130, a user input device 132 and a name server 134, which is a piece of software that runs in the controller 122, all of which are interconnected. The computer controller 122 coordinates all operations of the elements of the remote control 120 device in conjunction with the memory 126, which stores an operating system for the controller 122, initialization programs and files, and information downloaded from the enclosures 110a–c. A user interacts with the remote 120 via the user input device 132 and the output device 130, which can display still or video images and output audio. The user input device 132 can be physically distinct from the output device 130 (e.g, a keypad), or can be a touch sensitive matrix overlaying the display and video sections of the output device 130, which allows the user to interact with the images on the output device. Based on the user inputs, the controller 122 issues different control messages to the enclosures, these messages and the process of determining which message to issue having been previously downloaded by the remote control device 120 from the enclosure being controlled. Additional details of the enclosures 110, remote control 120, and information exchanged between them, are now discussed in reference to FIG. 2.

Figure 2:
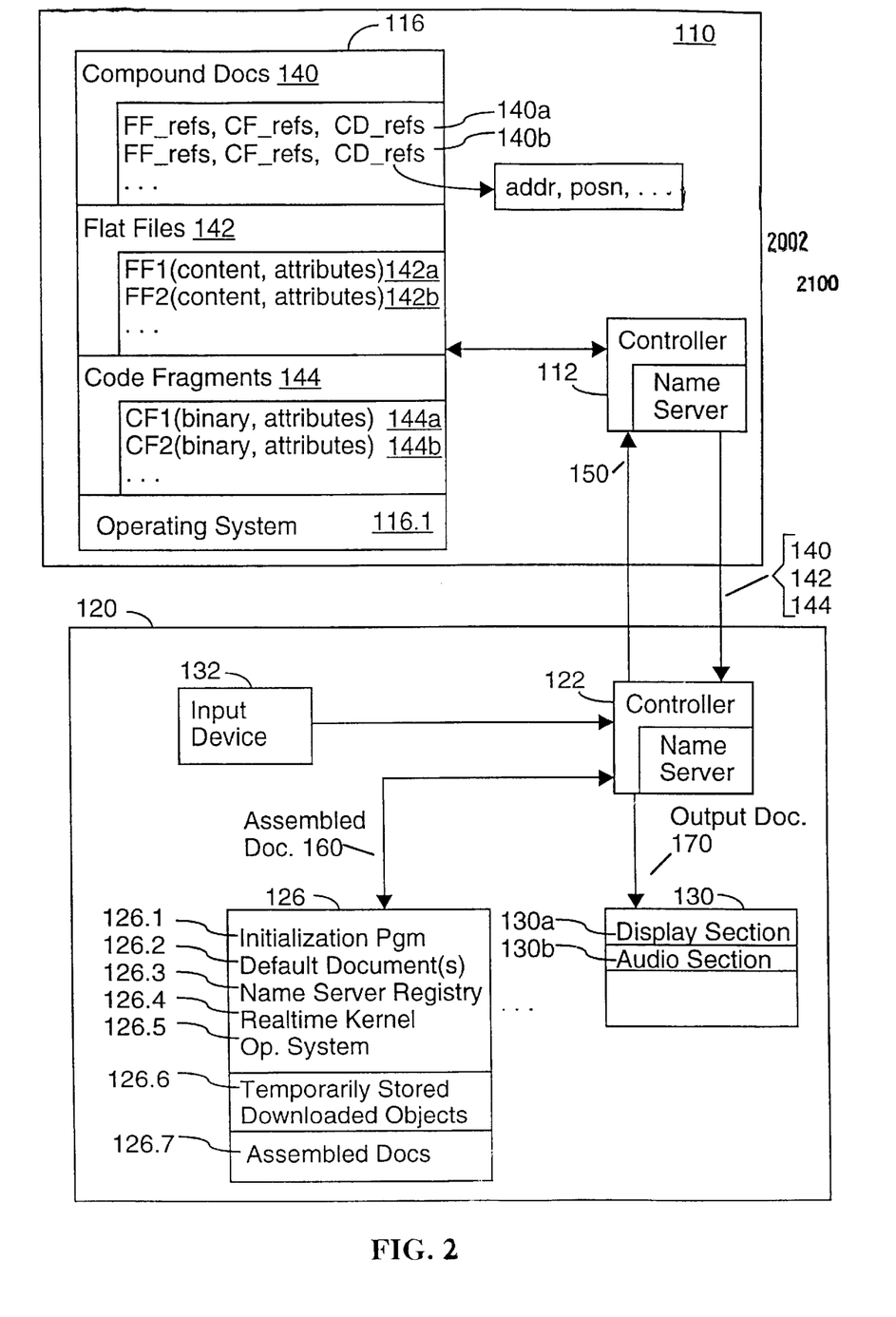
FIG. 2 is a more detailed block diagram of the preferred embodiment of FIG. 1.

Referring to FIG. 2, there is shown a detailed block diagram of the preferred embodiment in which the remote control device 120 is interacting with a single device enclosure 110. This figure shows additional details of the output device 130 and the memories 126, 116, which are now described.

The output device 130 includes two distinct sections, a display section 130a, which can display video or still images, and an audio section 130b, which can play sound clips. These two different output modalities are provided by the output device 130 so that all features of the output document 170 provided by the controller 122 can be fully realized. volatile storage capabilities, the non-volatile storage capabilities being provided to store program and data items that the remote control device 120 requires at initialization. These non-volatilely-stored items include an initialization program 126.1, default documents 126.2, name server registry 126.3 (i.e, network addresses of the devices 110a–c) and an operating system 126.5, which incorporates a real-time operating system kernel 126.4. The operating system 126.5 is a program that executes in the controller 122 whenever the remote control device 120 is up and running. Its duties include handling the controller 122's interactions with external devices, such as the user input device 132, display 130 and the RF transmitter/receiver 128, and managing programs being executed by the controller 122 (e.g., loading programs into the memory 126 for execution and handling program requests for access to external devices). The operating system 126.5 can operate in at least one of two modes. When the operating system 126.5 is functioning in a single-tasking mode, software jobs are performed to completion one at a time, with no consideration given to external time-constraints. The operating system 126.5 can also function in a multi-tasking, real-time mode, in which multiple jobs are performed simultaneously and under externally-imposed time constraints. These real-time capabilities are provided by the real-time kernel 126.4, which determines how the operating system allocates processing time in the controller 122 among multiple jobs so that each of the jobs runs in real-time. As will be explained later, these real-time capabilities are desirable in the preferred embodiment, where multiple code fragments, some of which provide user interactability, could be running simultaneously on the controller 122. We will now describe how the controller 122 is initialized, which process is driven by the initialization program 126.1.

Figure 3:
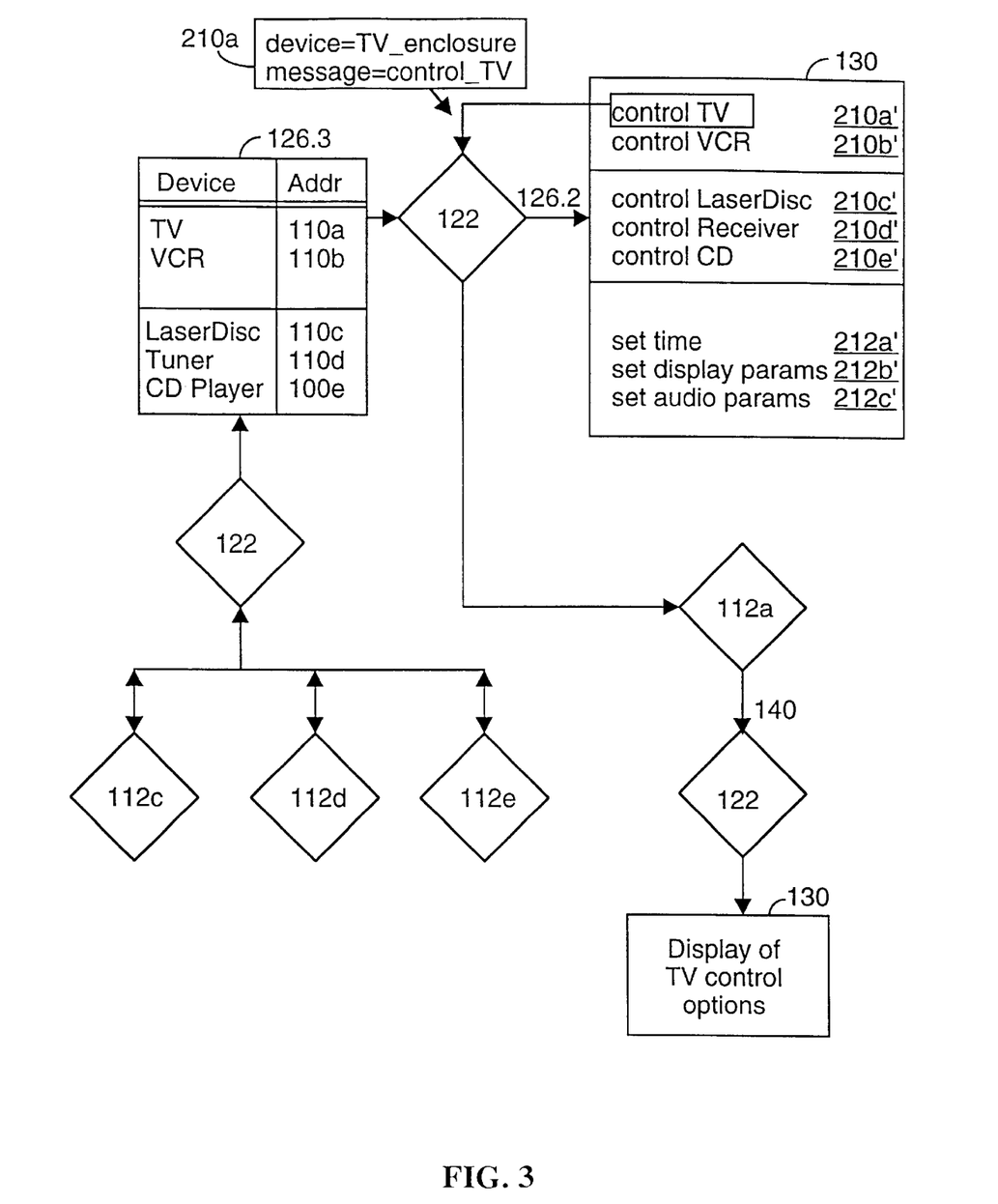
FIG. 3 is a data flow diagram showing how the preferred embodiment responds to a user's selection of device control and initialization options from a displayed default document.

Referring to FIG. 3, there is shown a data flow diagram depicting data transformation/transmission actions performed by the controllers 112 and 122 in response to some typical user interactions with the initialization program 126.1. This diagram shows data objects as rectangles and components that act on the data objects as diamonds. Some of the diamonds appear multiple times, representing components, such as the remote controller 122, that perform multiple actions. The initialization program 126.1, which is executed by the operating system 126.5 whenever the remote 120 is powered up, performs some housekeeping routines before handing off control of the remote 120 to a user. Among these housekeeping duties, the initialization program 126.1 causes the controller 122 to output the default document(s) 126.2 to the multimodal output device 130, making available to the user a set of selectable remote options. This default document 126.2 defines a set of user-selectable enclosure control options 210 (linked to the displayed control options 210') and remote setup options 212 (linked to the displayed setup options 212') that can be executed by the controller 122 without first issuing messages on the network. In the preferred embodiment, each enclosure control option 210 includes a first field specifying a local name of a device 110 to be controlled, which local name is correlated with the name of a device registered in the name server registry 126.3, and a second field specifying the name of a message to be issued to the device named in the first field when the control option is selected by a user from the display 130. For example, referring to FIG. 3, the two fields of the default document entry 210a are:

device=TV_enclosure; and message=req_doc(control_TV).

This particular entry 210a is linked to a user-selectable enclosure control option displayed by the controller 122 as "control TV" 210a'.

When the user selects one of the control options 210' from the display 130, the controller 122 determines the network ID of the appropriate device by consulting the name server registry 126.3 and then issues the associated message 150 to the specified device. For example, as shown in FIG. 3, when the user selects the displayed option 210a' ("control TV"), the controller 122 determines that the TV enclosure has the network address 110a and then issues to that address a document request message 150 for the "control_TV" document. Upon receiving a document request message, a controller 112, under control of its operation system 116.1, processes the message and responds accordingly. This response could be to implement an action, such as tuning in a TV channel, or returning a compound document 140 to the remote control 120. For example, in the situation of FIG. 3, the TV controller 112a simply returns to the controller 122 the contents of the compound document "control_TV" 140a, which specifies a basic set of operations for controlling the TV 114a that the controller 122 displays on the multimode display 130.

As stated above, the default document 126.1 also provides a list of system configuration options 212 (linked to displayed system options 212') that can be selected by a user from the user input device 132. Note that these options do not include an option that allows a user to "install new network devices." This is because the preferred embodiment performs network installations automatically. In this automatic installation process, as soon as the user plugs in a new enclosure 110, the new enclosure's controller 112 "wakes up" and begins operating under control of its operating system 116.1. Recognizing its "new" status, the operating system 116.1 asks its associated name server 119 to register the enclosure. In response, that name server 119 broadcasts on the network the name and address of the new enclosure to the other enclosures connected to the network. Upon receiving this message, the name servers running on the controllers 112 and 122 in the other enclosures register the new enclosure by updating their name server registries with the new device's network address and name. For example, if a user adds a laser disc player 110c, a tuner 110d and a CD player 110e to the network, the name server running on the controller 122 would add laser disc, tuner and CD player entries to the name server registry 126.3 as shown in FIG. 3. After registering the new enclosures 110c–d, the controller 122 downloads from each the name of an initial message (such as the control_TV message), references to which it adds to the default document 126.2 as the control options 210c–e'.

If the remote 120 loses its memory (including the name server registry 126.4) or if a new remote 120 is added to the network, the blank or new remote 120 is programmed to broadcast a request message asking the enclosures 110 to register themselves if that would be appropriate (some of the enclosures might not be compatible with the remote). In response, the enclosures would register themselves as described above. Collision avoidance procedures, which are well known in the art of networks, ensure that each of the registering enclosures is allowed to access the network.

In addition to storing addresses of all enclosures on the network, each name server 119, 134 lists the names and internal address of all of the documents (including compound documents, flat files and code fragments) that are stored in its memory 116, 126 and possible other relevant documents stored on other network nodes. This information allows the controller 122 to easily locate documents (for sending or displaying). Additional information on these and other aspects of name servers are provided in Sanjay Radia, Michael N. Nelson, and Michael L. Powell, The Spring Name Service, from: A Spring Collection, A Collection of Papers on the Spring Distributed Object-Oriented Operating System, SunSoft, September 1994, which is incorporated herein by reference.

Referring again to FIG. 2, the memory 116 of a device 110 includes compound documents 140, flat files 142, code fragments 144 and an operating system 116.1 that controls operations of the controller 112 whenever the device 110 is powered up. These objects 140, 142 and 144 encapsulate all of the information required by the remote 120 to control the operation of the device 110 on which the objects are stored. In the preferred embodiment, each compound document 140 contains references to flat files (FF_refs), code fragments (CF_refs) and other compound documents (CD_refs) that are meant to be displayed/executed by the controller 122 in a coordinated fashion, typically in a single window on the display 130. For example, a root compound document, such as the control_TV document mentioned above, contains references to objects 140, 142, 144 that, when displayed together by the controller 122, present a top-level listing of the TV's basic control options. In this approach, the flat file references (FF_refs) refer to text, graphics, or audio files to be output by the controller 122 and the code fragment references (CF_refs) refer to embedded applications to be executed by the controller 122 while displaying the compound document 140 or to handlers for the flat files 142 referenced in the compound document 140.

In the preferred embodiment, each CD_ref, FF_ref or CF_ref includes two fields:

"addr" (a document address); and

"posn" (a display position-not used for audio files).

The "addr" field specifies the unique address of the referenced object in the manner of a WWW hyperlink, except that in the preferred embodiment the object being referenced is generally stored on the same network node as the referencing document. The "posn" field indicates to the controller 122 where the object is to be positioned when the controller 122 displays the compound document 140.

A flat file 142 encapsulates two types of information, content and attributes. Content is the data that corresponds to what the flat file expresses, such as text, sound or image data. The attributes define meta-knowledge about the content, including how the data is formatted (which implies the type of its handler) and should appear/sound. For example, typical flat file attributes might indicate that the content is ASCLL-, HTML- or Postscript-formatted text, MIDI or WAV-formatted sound, or GIF-or JPEG-formatted graphics. This attribute information is necessary as it indicates to the controller 122 how the content should be processed before being output to the multimode output device 130.

A code fragment 144 also encapsulates two types of information, binary code for an embedded application that is executable on the controller 122 and attributes related to the binary code. For example, assuming that the code fragment 144a is a program that visually simulates some device control process, the attributes for that code fragment might define the attributes of the window in the referencing compound document in which the fragment 144a should run. In the preferred embodiment, embedded applications might include a program that runs an animated sequence showing the user how to select a complex device function using options displayed on the display 130, a program that determines a sequence of document request messages to be issued when a user selects a particular option, or even an expert system that can answer user questions about programming the devices 110.

However, the most typical embedded applications 144 transferred from an enclosure 110 to the remote 120 are handlers that are compatible with flat files 142 transferred from the same enclosure 110 to the remote 120, generally in the context of a common compound document 140. This is because, to promote true universality (the idea that the remote 120 is able to display/execute any information provided by any enclosure 110), the preferred embodiment assumes that the controller 122 knows nothing about displaying any type of flat file provided by the different enclosures 110. Operating under this assumption, for a referenced flat file 142 to be displayed on the remote display 130, the controller 122 must have access to a handler code fragment that is compatible with the referenced flat file 142. Once loaded by the controller 122, this handler will display/process the referenced flat file 142 and manage the real estate on the display 130 where the flat file is to be displayed.

For example, a button-type flat file might include a digitized, JPEG image of the cover of the novel, "War and Peace" and the network address of a flat file that contains the entire text of the novel. This flat file's associated handler would be required to display the cover in an appropriate size and at an appropriate screen position on the display 130. This flat file's handler might also contain a method that is triggered whenever a user selects the region of the display 130 on which the cover is displayed, causing the controller 122 to issue a network message requesting the text of "War and Peace" using the address contained in the flat file.

In the preferred embodiment, a handler's executable code is not packaged along with the flat file(s) it is meant to handle, but is often referenced via a CF_ref in the compound document referencing its associated flat files. Alternatively, no CF_ref to the handler is required when a handler's identity can unambiguously be implied by the attributes of the referenced flat file alone (e.g, if the file is MIDI audio, to play the file, the controller 122 will simply request a MIDI device driver on the network). One advantage of this approach (where data and handler executable code are separated) is that the remote control 120 retains backward compatibility with data files as they are typically constituted (i.e., data files, such as .WAV files, are generally not packaged with their handlers); while being able to handle seamlessly all manner of unknown data files. This arrangement also avoids the inefficiency of requiring the remote 120 to unnecessarily download the same handler multiple times.

In the preferred embodiment, even the simplest type of flat files (e.g, scrolling ASCII text) requires a corresponding handler code fragment running on the remote 120. Assuming that none of the corresponding handlers are locally available to the controller 122, in the case of a complex compound document that references many flat files of different formats this fact could result in much downloading of handler code fragments. The preferred embodiment significantly reduces this risk by pre-storing in the memory 126 handler code fragments for common flat file data formats, such as .WAV and MIDI audio, ASCII text and JPEG graphics.

Figure 4:
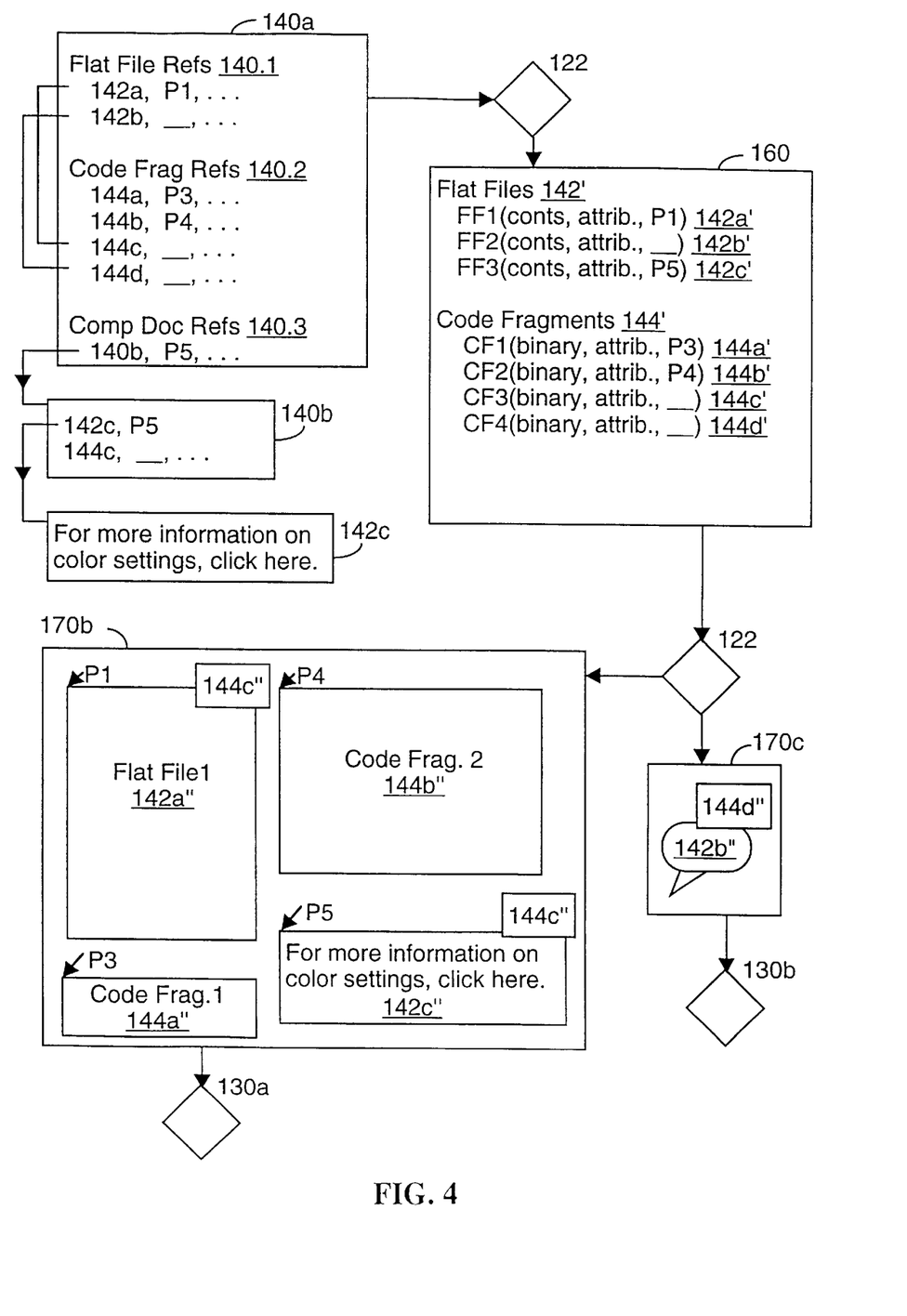
FIG. 4 is a data flow diagram showing how the preferred embodiment transforms a compound document into an assembled document then into output documents with embedded applications.

Referring to FIG. 4, there is shown a data flow diagram illustrating how a particular compound document 140*a* requested by the controller is processed before being output to the multimodal display 130. As in FIG. 3, this diagram shows data objects as rectangles and components that act on the data objects as diamonds. Some of the diamonds appear multiple times, representing components, such as the remote controller 122, that perform multiple actions on the data flow.

Assume that, as discussed previously in reference to FIG. 3, a user has selected an option such as "control_TV", that triggered the controller 122 to request the "control_TV" document 140*a* from the TV enclosure 110*a*, and that, in response, the TV device has returned the compound document 140*a* depicted in FIG. 4. This document 140*a* includes references 140.1 to two flat files, 142*a*, 142*b*, the first of which is to be positioned at point P1 on a window corresponding to the displayed compound document (note the document 142*b* has no associated position as it is an audio file). The document 140*a* also includes references 140.2 to the code fragments 144*a* and 144*b*, with respective display positions of P3 and P4, respectively, and to the code fragments 144*c*, 144*d*, which are handlers for the flat files 142*a*, 142*b*, respectively. Finally, the document 140*a* includes a reference 140.3 to the compound document 140*b*, which is to be positioned at position P5 on the display 130. The compound document 140*b* includes references a flat file 142*c* and the handler 144*c* for that file, which is identical to a handler already referenced in the compound document 140*a*.

From the compound document 140*a*, the controller 122 builds an assembled document 160, which is stored by the controller 122 in a volatile section of the memory 126 as a stored assembled document 126.7 (FIG. 2). Generally, an assembled document 160 is an internal representation of a compound document 140 in which all of the references have been recursively resolved, either to a code fragment or to a flat file/handler pair. For example, in the case of the compound document 140*a* from FIG. 1, the assembled document 160 includes assembled versions 142*a*', 142*b*', 142*c*' of the flat files 142*a*, 142*b*, 142*c*; and assembled versions 144*a*'–*d*' of the code fragments 144*a*–*d*. Note that an assembled version of an object combines information from the actual object (e.g., in the case of a flat file, the contents and attributes) and the object's output position, where relevant. This information allows the controller 122 (using the appropriate handlers) to convert the assembled compound document 160 to a formatted output document 170 that can be directly output on the multimodal output device 130 in the manner envisioned by the designers of the particular device 110 being controlled.

For example, in FIG. 4, the output document 170*b*, corresponding to a image that can be output on the display section 130*a*, defines windows at positions P1, P3, P4 and P5 where the output flat files 142*a*", 142*c*" and executing codes fragments 144*a*", 144*b*" are simultaneously output by the controller 122. Each of these windows is under the control of a code fragment 144*a*"–*c*". For example, the displayed flat files 142*a*", 142*c*" are both displayed under the control of the executable code fragment/text handler 144*c*". The executing code fragments 144*a*"–*d*" can be one of four types: (1) output code that, when executed, produces a visual or audible manifestation (e.g, graphical or sound simulations), (2) meta-knowledge code that can advise a user regarding legal interactions with the document in which the code fragment was embedded, (3) contextual code that can sense and indicate the processing context of the compound document in which the code fragment was embedded, and (4) handlers for embedded data (described above). One example of the first type of executable code fragment is an animation that shows a user how to connect their cable to the back of the TV enclosure 110*a*. An example of the second type of code fragment is a smart help application that can tell the user how to select the functions displayed in the flat file 142*a*". Finally, an example of the third type of code fragment is a smart icon, or cartoon, that monitors controller traffic to and from the remote control 120 and then signals a user, for example, by waving an animated hand, that transmissions are underway.

Because multiple code fragments and flat files might need to be output to the output device 130 simultaneously, the real-time kernel 126.5 is required to achieve perceptibly real-time output and to avoid user frustration. Finally, because the flat file 142*b*" is a sound file (e.g., a .WAV file) the controller 122 processes it with an appropriate handler 144*d*" and outputs the resulting real-time sound 170*b* to the audio section 130*a* of the multimodal output device.

Figure 5:
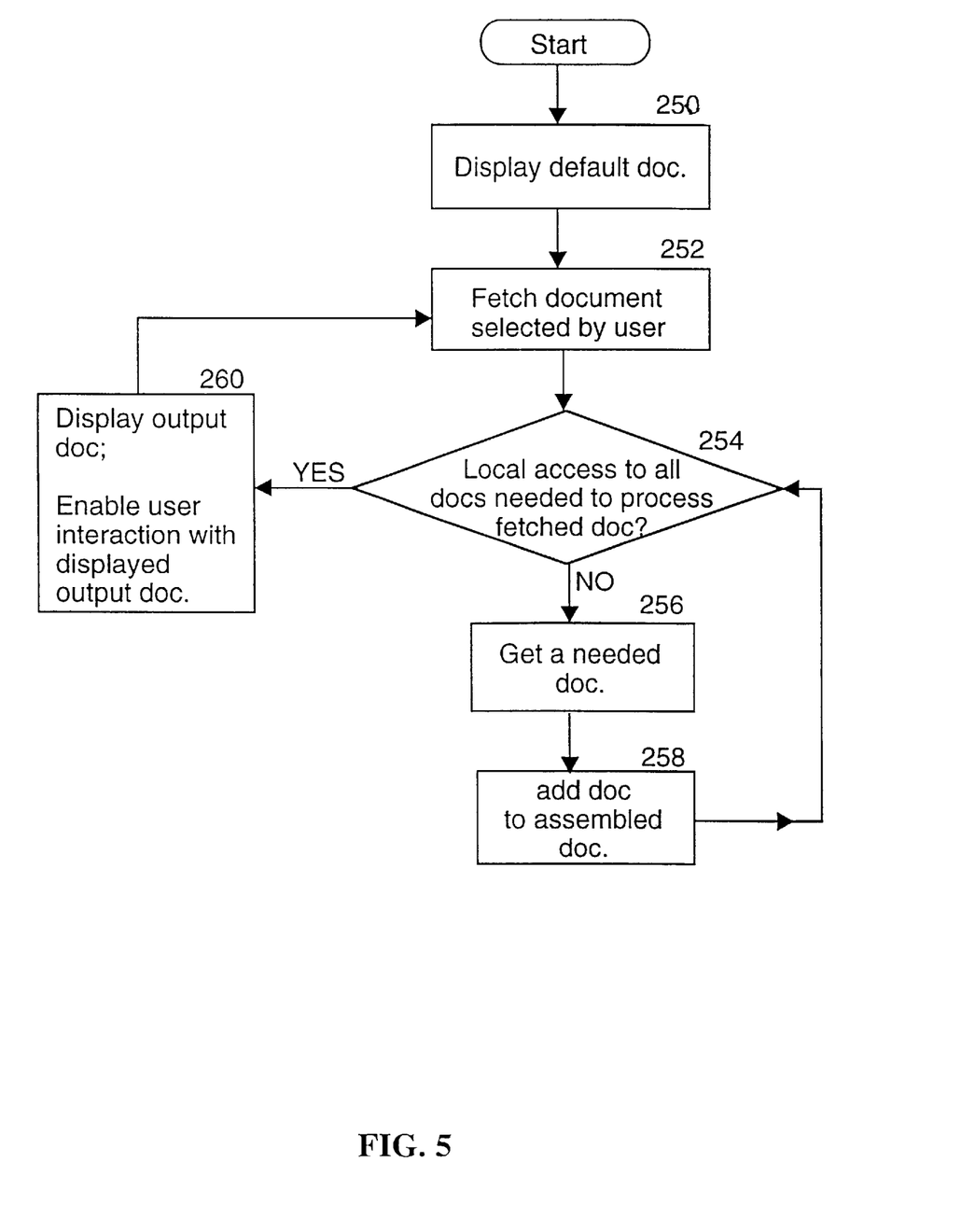
FIG. 5 is a flow chart showing the steps of the preferred embodiment.

The method by which the controller builds an assembled document is illustrated in FIG. 5, which is a flow chart of the method of the preferred embodiment.

As mentioned above in reference to FIG. 3, the first step in the method of the preferred embodiment is to display the default document(s) 126.2, from which the user can select a number of basic options (250). Once a user has selected one of these options, the controller 122 fetches from the network the appropriate document (252). For example, as mentioned above, when the user selects the control-TV option, the controller 122 issues a document request message for the control_TV document to the TV 110*a*. Upon receiving the compound document 140, the controller 122 determines whether it has local access to all of the documents that are needed to process the first compound document (254). If not (254-NO), the controller 122 pulls in from the network all of the needed documents that are not locally available (256). For example, in the case illustrated in FIG. 4, prior to displaying the control_TV document, the controller 122 downloads from the TV enclosure 110*a* the referenced flat files 142*a*–*c* and the code fragments 144*a*–*d*. Each of these objects are temporarily stored in the memory 126 as the temporarily stored downloaded objects 126.6 (258).

In the preferred embodiment, the required documents discussed in reference to FIG. 5 could encompass two different classes of information. First, a required document might be an object (flat file, code fragment or other compound document) that is explicitly referenced in a downloaded compound document. These explicitly referenced objects are included in the assembled document 160. This inclusion process is recursive and can proceed until a leaf level object (i.e, one with no referenced compound documents objects) is finally retrieved by the controller 122.

Second, a required document could be an unreferenced handler for the particular type of file just retrieved, where the identity of a required handler is determined by an embedded document's attribute field. For example, if the flat file 142*b* were a .WAV audio file, and the controller 122 did not currently have local access to a .WAV audio file handler and one was not referenced in the compound document 140a, the controller 122 would issue a request to all of the networked devices 110 for an appropriate audio handler. Upon receiving the handler, the controller 122 would then install the handler and begin executing the handler on the contents of the related flat file 142. Alternatively, the controller 122 can temporarily store the handler in the memory space 126.7 with the related flat file and play the flat file when the rest of the assembled document 160 is ready to be output.

After all of the embedded compound documents have been recursively retrieved (i.e., after building the assembled document 160), the controller 122 generates the complete output document 170, which it outputs to the multimodal output device 130 (260). Based on the types of the files, different parts of output document 170 are directed to different sections of the output device. For example, in the case where the flat file is an audio file, its corresponding output document 170b is directed to the audio section 130b of the output device 130. The other embedded documents of the document 140a, all of which are graphically-oriented, are included in an output document 170a that is output to the display section 130a of the output device 130. In the case were some of the flat files 142 and/or executable code fragments 144 involve the generation of video data, those objects are also output to the display section 130a. Alternatively, the controller 122 can output to the output device completed parts of the assembled document 160 as soon as they are ready.

Once the completed assembled document has been output to the output device 130, the controller 122 provides for user interaction whereby the user can select various options (260) from the user input device 132. If the user selects an option requiring the controller to fetch a document over the network, the aforementioned steps of the method are all repeated. Of course, in some situations, such as illustrated in FIG. 3, the user can select options, such as "set time" 212a, "set display params" 212b' or "set audio params" 212c', that are local to the remote control device 120.

ALTERNATIVE EMBODIMENTS

The preferred embodiment is directed to networked, computer-controlled, home entertainment equipment and a compatible, computer-controlled remote control device that can be used to operate the various components based on downloaded compound documents. However, the system and method of the preferred embodiment is also applicable to networks of computers.

Figure 6:
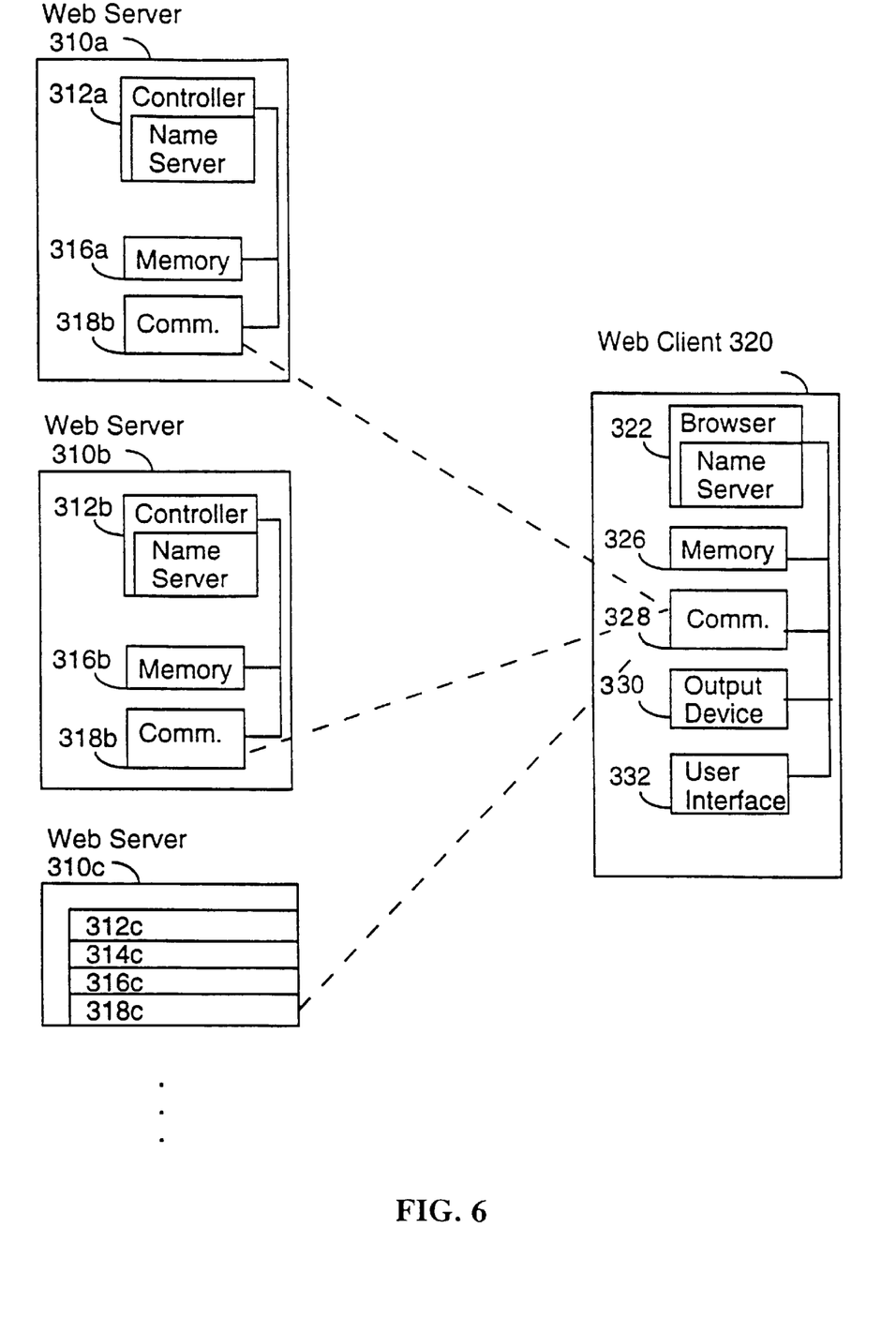
FIG. 6 is a depiction of an alternative embodiment where the clients, servers and network of FIG. 1 are Web clients, Web servers and the Internet, respectively.

For example, in one alternative embodiment, illustrated in FIG. 6, the device enclosures 110 are exchanged for Web servers 310 and the remote control 120 for a Web client 320. A Web browser 322 running on the Web client performs the various compound document file retrieval, processing and output operations ascribed above to the controller 122. Some of the controller's actions, such as downloading uniquely specified documents as a result of a user selecting a reference are already performed by many Web browsers. However, unlike the alternative embodiment, no Web browsers are configured to download then run (optionally, in real time), executable code fragments that are referenced or embedded in Web documents. These capabilities are provided by the alternative embodiment in three different contexts.

First, a reference to a code fragment can be embedded in an HTML (compound) document so that the reference is displayed by the Web browser as a hyperlink, the selection of which causes the browser to download and run the code fragment. Second, a reference to a code fragment can be embedded in an HTML document so that the code fragment is automatically retrieved and run by the Web browser upon receiving the Web page that includes the code fragment. This type of included code fragment is useful for providing dynamic knowledge that is always associated with a particular page no matter what browser is being used. For example, a Web page that makes use of this aspect of the present invention might provide an embedded application that selects the best (i.e., least busy) server for a referenced document from among several alternatives based on known (to the embedded program) network activity patterns and the time of day. Finally, as in the situation of the audio file mentioned above, a Web browser operating in accordance with the alternative embodiment can download appropriate handlers based on the attributes of a previously received data file or when the handler's URL is specified in the same HTML-like document that references a compatible flat file.

One aspect of the preferred embodiment that would function differently in the WWW environment is server registration, which is the process whereby servers make their presence known to the client. In the WWW environment, server and client connections are not direct. Consequently, new Web servers' name servers cannot simply register their names and addresses with the Web clients' name servers. However, another simple registration process can be implemented wherein the Web servers automatically register with an appropriate directory, such as Yahoo, upon going online or changing their Internet address. The client's name server can then periodically register new servers from that directory.

In summary, the alternative embodiment of FIG. 6 is a Web browser and a set of compatible HTML-like compound documents that implement the method and system of the present invention. Specifically, the alternative Web browser 322 can process HTML-like documents in which executable code fragments are explicitly referenced or implied in an attribute field associated with a data file. In the alternative embodiment, few modifications are required to existing Web servers 310, the only real change on the Web server side being the form of the HTML documents that are stored on the various servers. That is, in the alternative embodiment, new fields are added to the HTML documents to embed executable code fragments and to provide any additional file attributes that might be needed for appropriate handlers to be downloaded by the Web browsers 322, thereby allowing Web browsers to display/process any type of flat file without any prior knowledge of file formats nor local access to an appropriate handler.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A control system, comprising:
   a system controller and a plurality of devices, interconnected by a communications network;
   the system controller including a data processor and a communications module for sending and receiving messages to and from the devices;
   each of the devices including memory for storing a control program and a module for sending the control program to the system controller upon request by the system controller;

the system controller including memory for storing the control program sent by each of the devices;

the system controller configured to execute each of the control programs sent by each respective one of the devices so as to control operation of the respective devices, including sending control messages to the respective devices;

the system controller further configured to request a control program from one or more of the devices at various times, including at a time other than registration of the device on the communications network;

each of the respective devices including a respective local controller for controlling operation of the respective device in accordance with control messages received from the system controller;

whereby the system controller controls each of the devices using a respective control program received from that device via the network.

2. The control system of claim 1, wherein each of the devices comprising a server and the system controller comprising a client.

3. The control system of claim 1, wherein the control program sent by at least one of the devices to the system controller is embedded in a compound document.

4. The control system of claim 1, wherein the control program sent by one of the devices encapsulates all data and routines necessary for its execution and is encoded so that it is executable by said client in real time.

5. The control system of claim 4, wherein the system controller includes a real time kernel that configures the system controller to manage execution of at least two of the control programs with real time constraints so that jobs performed by the at least two control programs complete in accordance with the real time constraints.

6. A method of controlling a plurality of devices interconnected on a communications network, comprising the steps of:

storing in each of the devices a control program and sending the control program from each of the devices to a system controller upon request by the system controller, the requests being sent by the system controller at various times, including at a time other than registration of the devices on the communications network;

at the system controller, executing the control programs sent by the respective devices so as to control operation of the respective devices, including sending control messages to the respective devices; and at each of the respective devices, controlling operation of the respective device in accordance with control messages received from the system controller;

whereby the system controller controls each of the devices using a respective control program received from that device via the communications network.

7. The control method of claim 6, wherein the control program sent by at least one of the devices to the system controller is embedded in a compound document.

8. The control method of claim 6, wherein the control program sent by one of the devices encapsulates all data and routines necessary for its execution and is encoded so that it is executable by said client in real time.

9. The control method of claim 8, wherein the system controller includes a real time kernel that configures the system controller to manage execution of at least two of the control programs with real time constraints so that jobs performed by the at least two control programs complete in accordance with the real time constraints.

10. The control system of claim 1, wherein the plurality of devices include devices having heterogeneous primary functions.

11. The control system of claim 1, wherein the system controller requests that a device send a control program in response to input from a user.

12. The control system of claim 1, wherein the system controller stores a new control program for a respective device for which a prior control program was previously stored.

13. The method of claim 6, wherein the plurality of devices include devices having heterogenous primary functions.

14. The method of claim 6, wherein a device sends a control program to a system controller upon request by the system controller in response to input from a user.

15. The method of claim 6, wherein the system controller controls a respective device using a new control program sent by the respective device, after having previously controlled the respective device using a prior control program sent by the respective device.

16. A method of controlling a plurality of devices interconnected on a communications network, the method comprising:

storing in a system controller a name server registry that identifies each of the plurality of devices;

storing in the system controller a request control program instruction for each of the plurality of devices;

at the system controller, executing a request control program instruction to send a request for a dynamic control program to a respective device;

sending a dynamic control program from the respective device to the system controller upon the request by the system controller;

storing in the system controller the dynamic control program sent by the respective device;

at the system controller, executing the dynamic control program sent by the respective device so as to control operation of the respective device, including by sending control messages to the device; and at the respective device, controlling operation of the respective device in accordance with control messages received from the system controller.

17. The method of claim 16, wherein the storing in the system controller of the name server registry and the default request instruction occurs non-volatilely.

18. The method of claim 16, further comprising sending, from a respective device to the system controller, an identifier of the respective device and a request control program instruction at the time the respective device is registered on the communications network.

19. The method of claim 16, wherein the executing of the request control program instruction occurs based upon user input to the system controller.

20. The method of claim 16, wherein the sending of the dynamic control program occurs at a time other than registration of the respective device on the communications network.

21. The method of claim 16, wherein the plurality of devices include devices having heterogenous primary functions.

22. A control system for controlling a plurality of devices interconnected on a communications network, the control system comprising:

each of the devices of the plurality of devices comprising:
a name server for storing an identifier of the respective device;

memory for storing a dynamic control program and a request control program instruction for the respective device;

a communications module for sending and receiving messages to and from the system controller; and a local controller for controlling operation of the respective device in accordance with control messages received from the system controller;

wherein the communications module is configured to send the device identifier and the request control program instruction to the system controller when the respective device registers on the communications network;

wherein the communications module is configured to send the dynamic control program to the system controller in response to a request from the system controller;

a system controller comprising:

a name server registry that identifies each of the plurality of devices;

memory for storing the dynamic control program and the request control program instruction for each of the plurality of devices; and a communications module for sending and receiving messages to and from the plurality of devices;

wherein the system controller is configured to execute each of the dynamic control programs sent to the system controller by each respective device so as to control operation of the respective device, including by sending control messages to the device;

wherein, prior to receiving a dynamic control program from a respective device, the system controller is configured to execute the request control program instruction for the respective device to generate a request for the dynamic control program.

23. The control system of claim 22, wherein the name server registry and that portion of the memory storing the request command program instruction comprises non-volatile memory.

24. The control system of claim 22, wherein the system controller is configured to request a dynamic control program from a device at a time other than the registration of the device on the communications network.

25. The control system of claim 22, wherein the system controller is configured to execute the request command program instruction based upon input from a user.

26. The control system of claim 22, wherein the system controller is configured to control a respective device using a new dynamic control program sent by the respective device, after having previously controlled the respective device using a prior control program sent by the respective device.

27. The control system of claim 22, wherein the plurality of devices include devices having heterogenous primary functions.

* * * * *